US012715388B1

(12) United States Patent
Gilmore et al.

(10) Patent No.: US 12,715,388 B1
(45) Date of Patent: Aug. 25, 2026

(54) SNAP-THROUGH TWO-PIECE PRESSURE RELIEF VALVE

(71) Applicant: Toyota Motor Engineering & Manufacturing North America, Inc., Plano, TX (US)

(72) Inventors: Paul A. Gilmore, Howell, MI (US); Shinnosuke Shimokawa, Ann Arbor, MI (US); Phouvadol P. Khouphongsy, Saline, MI (US); Jorge C. Gonzalez Salinas, Ann Arbor, MI (US); Louis J. Brady, Romulus, MI (US); Gurmeet Singh, Ann Arbor, MI (US)

(73) Assignees: Toyota Motor Engineering & Manufacturing North America, Inc., Piano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 19/063,552

(22) Filed: Feb. 26, 2025

(51) Int. Cl.
*F16K 17/02* (2006.01)
*B60R 21/26* (2011.01)

(52) U.S. Cl.
CPC ............ *B60R 21/26* (2013.01); *F16K 17/025* (2013.01); *B60R 2021/26094* (2013.01)

(58) Field of Classification Search
CPC ........... B60R 21/26; B60R 2021/26094; F16K 17/025; F16K 17/1606
See application file for complete search history.

(56) References Cited

U.S. PATENT DOCUMENTS

| | | | | |
|---|---|---|---|---|
| 5,524,925 | A | 6/1996 | Rose et al. | |
| 5,551,723 | A | 9/1996 | Mahon et al. | |
| 5,704,639 | A | 1/1998 | Cundill et al. | |
| 6,273,463 | B1 | 8/2001 | Peterson et al. | |
| 6,702,323 | B2 * | 3/2004 | Goetz | B60R 21/217 280/736 |
| 7,036,843 | B2 | 5/2006 | Okamoto et al. | |
| 7,147,246 | B2 | 12/2006 | Breed et al. | |
| 7,338,069 | B2 | 3/2008 | Breed | |
| 2019/0039557 | A1 | 2/2019 | Barnes et al. | |

FOREIGN PATENT DOCUMENTS

| | | | |
|---|---|---|---|
| KR | 100928093 | B1 | 11/2009 |
| TW | 201330888 | A | 8/2013 |
| WO | 2020052720 | A1 | 3/2020 |

* cited by examiner

*Primary Examiner* — P. Macade Nichols
(74) *Attorney, Agent, or Firm* — Christopher G. Darrow; Darrow Mustafa PC

(57) ABSTRACT

Systems, methods, and other embodiments described herein relate to a pressure relief valve that exhibits high flow rates at low pressures. The pressure relief valve includes a compressible hollow sleeve with an inner channel that is in fluid communication with an inflatable energy-absorbing body. The pressure relief valve also includes a dome-shaped sealing body that is affixed to a rigid substrate. The dome-shaped sealing body is pressed against and covers an outlet of the inner channel. Responsive to a gas pressure through the compressible hollow sleeve being greater than a threshold pressure, the dome-shaped sealing body deflects with snap-through buckling to expose the outlet through which the gas escapes.

20 Claims, 9 Drawing Sheets

SNAP-THROUGH TWO-PIECE PRESSURE RELIEF VALVE

TECHNICAL FIELD

The subject matter described herein relates, in general, to pressure relief valves and, more particularly, to a two-piece pressure relief valve that exhibits snap-through buckling to provide high flow rate pressure relief at low pressures.

BACKGROUND

Energy-absorbing devices absorb and dissipate energy and can be used to reduce impact forces. For example, during a vehicle collision, a crumple zone on the frame of a vehicle reduces the impact forces imparted to the passengers of the vehicles. Specifically, the crumple zone deforms in a controlled fashion, thus absorbing and dissipating the kinetic energy of the collision and reducing the impact force experienced by the occupant.

Another example of an automotive energy-absorbing device is an airbag. Upon detection of an impact, the airbag inflates to provide a cushion for the occupant to prevent potential injury. The airbag protects an occupant from colliding with hard surfaces such as the dashboard, steering wheel, or window of the vehicle. Thus, the energy-absorbing devices of a vehicle increase the safety of driving and reduce the risk of harm to the occupants if a collision occurs.

While particular reference is made to energy-absorbing devices in a vehicle, energy-absorbing devices are found in many applications. In these applications, inflatable structures may absorb the energy of and cushion an object and/or an individual. Other energy-absorbing devices include fall arrest systems that capture a person or object falling from a height, inflatable protective gear, inflatable landing systems, inflatable rescue gear, and inflatable medical devices. Moreover, inflatable energy-absorbing devices may be used in many products that have yet to be developed.

SUMMARY

In one embodiment, example systems and methods relate to a manner of improving pressure relief systems. In one embodiment, a pressure relief valve is disclosed. The pressure relief valve includes a compressible hollow sleeve with an inner channel. The inner channel is in fluid communication with an inflatable energy-absorbing body. The pressure relief valve also includes a dome-shaped sealing body affixed to a rigid substrate. The dome-shaped sealing body covers and is pressed against an outlet of the inner channel. Responsive to gas pressure through the compressible hollow sleeve being greater than a threshold pressure, the dome-shaped sealing body deflects with snap-through buckling to expose the outlet through which the gas escapes.

In one embodiment, an energy-absorbing device is disclosed. The energy-absorbing device includes an inflatable energy-absorbing body. The energy-absorbing device also includes a pressure relief valve. The pressure relief valve includes a compressible hollow sleeve with an inner channel. The inner channel is in fluid communication with an inflatable energy-absorbing body. The pressure relief valve also includes a dome-shaped sealing body affixed to a rigid substrate. The dome-shaped sealing body covers and is pressed against an outlet of the inner channel. Responsive to gas pressure through the compressible hollow sleeve being greater than a threshold pressure, the dome-shaped sealing body deflects with snap-through buckling to expose the outlet through which the gas escapes.

In one embodiment, a method for using a pressure relief valve is disclosed. The method includes covering and pressing a dome-shaped sealing body over an outlet of an inner channel of a compressible hollow sleeve that is in fluid communication with an inflatable energy-absorbing body. Responsive to gas pressure through the compressible hollow sleeve being greater than a threshold pressure, the dome-shaped sealing body is deflected with snap-through buckling to expose the outlet through which the gas escapes.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
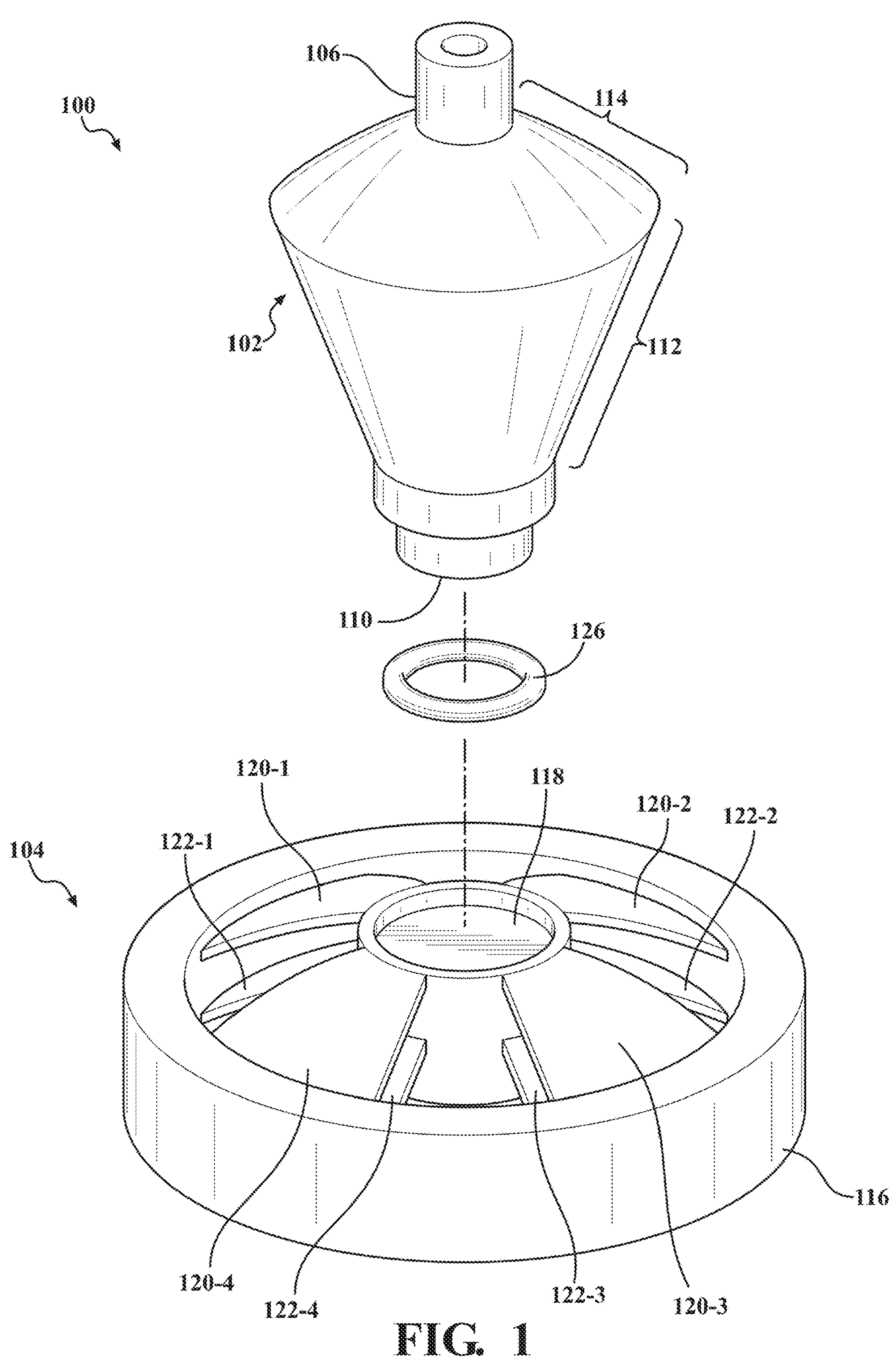
FIG. 1 is an exploded isometric view of the pressure relief valve that exhibits snap-through buckling, according to an embodiment of the principles described herein.

Devices and methods associated with improving the operation of inflatable energy-absorbing devices are disclosed herein. As previously described, inflatable energy-absorbing devices are used in various applications where it is desirable to absorb the kinetic energy of a moving object. A specific example of an inflatable energy-absorbing device is a vehicle airbag that rapidly inflates responsive to a detected impact. Specifically, the airbag rapidly fills with nitrogen gas. The airbag slows down the sudden movement of the passenger and protects the passenger from collision with hard vehicle surfaces.

While these inflatable energy-absorbing devices have undoubtedly reduced the risk of occupant injury and saved many lives, additional developments to inflatable energy-absorbing devices may further increase their efficacy and life-saving characteristics. For example, were an inflatable energy-absorbing device over-inflated, the inflatable energy-absorbing body would be hard instead of soft, thus frustrating the purpose of the device to cushion the object or passenger. That is, the object would not be gently enveloped in the inflatable energy-absorbing body but would strike the inflatable energy-absorbing body with greater force.

Even if the inflatable energy-absorbing device is not over-inflated, if the gas within the inflatable energy-absorbing body does not have an escape, the object or occupant may experience a spring-back or rebound effect where their motion, rather than being gradually slowed, would be suddenly redirected in the opposite direction.

Accordingly, the present specification describes a lightweight, high flow rate pressure relief valve, as may be found for example, in an inflatable energy-absorbing device such as an airbag. The pressure relief valve allows gas to escape the inflatable energy-absorbing device to slow down the moving object (e.g., the body of a passenger) as it engages with the inflatable energy-absorbing device. This helps to absorb the kinetic energy of the moving object, thus reducing the likelihood of injury to the individual and/or damage to the moving object. Even more specifically, the vent reduces the deceleration rate of the moving object, which reduces the severity of the sudden movement of the object and/or the passenger.

However, rather than being a static vent, such as a cutout in the inflatable energy-absorbing body fabric, the present specification describes a dynamic pressure relief valve that can operate at low pressures and facilitates a high gas flow rate. That is, a static vent may be structured to allow gas to escape an inflatable energy-absorbing body in an uncontrolled fashion without consideration of the optimal energy-absorbing characteristics of the inflatable energy-absorbing body. That is, it may be desirable that a particular flow rate be achieved and that gas escape occurs at a particular threshold pressure to enhance the energy-absorbing characteristics of the device.

Moreover, when a vent hole is implemented, gas starts escaping immediately and throughout the entire deployment of the energy-absorbing device. Accordingly, vent holes may trigger the use of larger inflators to provide enough air to replace this escaping air while keeping high pressure within the energy-absorbing body. Due to these and other circumstances, a fabric slit with uncontrolled flow rates and triggering pressures may not be able to achieve the desired or optimal energy-absorbing effect.

In general, the pressure relief valve of the present specification is a two-piece system. The first component is a compressible hollow sleeve that is in fluid communication with the inflatable energy-absorbing body. That is, there may be a gas flow path between the inflatable energy-absorbing body and the inner channel. The second component is a dome-shaped sealing body that is pressed against the compressible hollow sleeve outlet. The dome-shaped sealing body exhibits nonlinear spring behavior. Put another way, the dome-shaped sealing body may exhibit snap-through type deflection.

Once the gas pressure within the compressible hollow sleeve reaches a predetermined value, which predetermined value may represent the contact of the inflatable energy-absorbing body by a moving body, the dome-shaped sealing body may suddenly deflect away from the outlet of the compressible hollow sleeve such that gas from the inflatable energy-absorbing body may escape. That is, as the moving body engages with the inflatable energy-absorbing body, the gas pressure within the inflatable energy-absorbing body increases. This gas pressure pushes outward on all surfaces, including the portion of the dome-shaped sealing body that covers the outlet of the compressible hollow sleeve. The dome-shaped sealing body is constructed such that when the gas pressure reaches a predetermined value, the pressure force causes the dome-shaped sealing body to quickly deflect away from the outlet of the compressible hollow sleeve. This deflection, which may be referred to as snap-through deflection, results in a sudden displacement of the dome-shaped sealing body away from the compressible hollow sleeve. This separation generates a large orifice that can accommodate high gas flow rates, such as nitrogen or air, through the pressure relief valve.

The dome-shaped sealing body may be bi-stable or mono-stable. A bi-stable dome-shaped sealing body may allow all the gas to escape and may not close unless manually re-set. A mono-stable dome-shaped sealing body may re-seal the outlet once a target threshold pressure is reached. In this case, the inflatable energy-absorbing body may remain at least partially inflated.

In either example, the compressible hollow sleeve and the dome-shaped sealing body may be formed from an elastically deformable material such as silicone or polyurethane. Specific details regarding the structure of the compressible hollow sleeve and the dome-shaped sealing body are provided below. Before deployment, the dome-shaped sealing body may be pressed against the compressible hollow sleeve to maintain a seal until the separation-inducing threshold pressure is achieved.

In this way, the disclosed systems, methods, and other embodiments improve the energy absorption of inflatable energy-absorbing bodies. Previously, the energy-absorption of an inflatable energy-absorbing body may be enhanced by increasing the size of the inflatable energy-absorbing body or providing larger, more powerful, or additional inflators, which may increase at least the cost and complexity of these energy-absorbing systems. By having a pressure relief valve that can open quickly at a customized predetermined pressure, the present pressure relief valve can increase the energy-absorption characteristics of an energy-absorbing system without requiring larger or additional inflators and/or larger or additional inflatable bodies. Moreover, because the gas escape is controlled (as opposed to continuous and throughout the entire deployment), the present pressure relief valve may allow the user of a smaller inflator. Moreover, the pressure relief valve of the present specification reduces a spring back or rebound effect and is customizable to deploy at a particular flow rate, further enhancing the safety-providing characteristics of the system.

While particular reference is made to vehicular inflatable energy-absorbing devices, the present pressure relief valve may be used on other energy-absorbing devices such as fall arrest systems, inflatable protective gear, inflatable landing systems, inflatable rescue gear, and inflatable medical devices, to name a few. Moreover, inflatable energy-absorbing devices may be used in many products that have yet to be developed.

Turning now to the figures, FIG. 1 is an exploded isometric view of the pressure relief valve 100 that exhibits snap-through buckling or deflection, according to an embodiment of the principles described herein. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 5A:
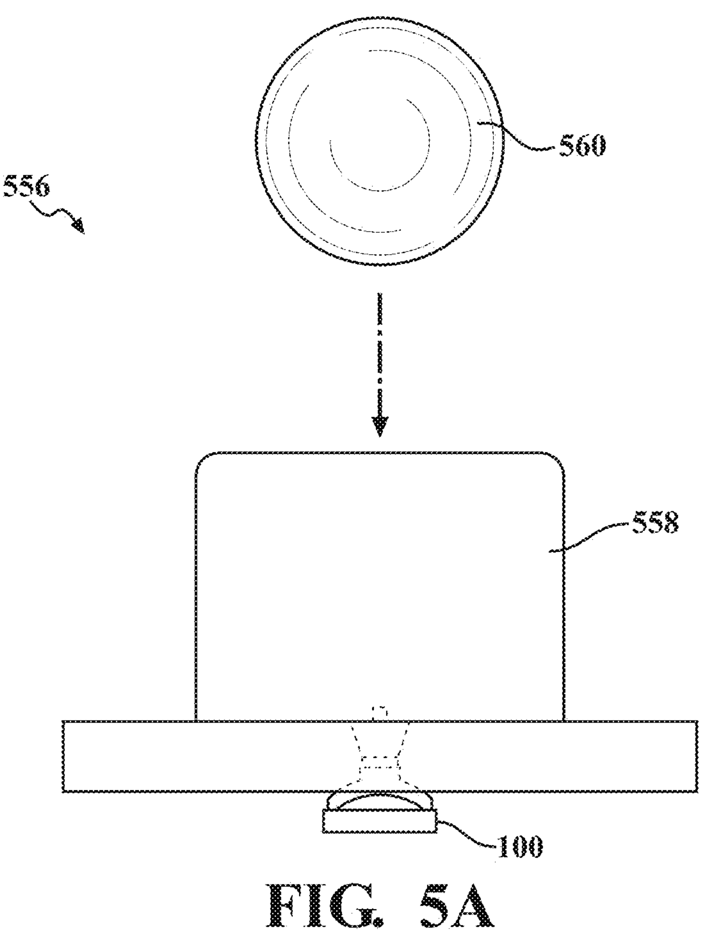
FIGS. 5A-5D depict an energy-absorbing device incorporating a pressure relief valve that exhibits snap-through buckling, according to an embodiment of the principles described herein.
Figure 5B:
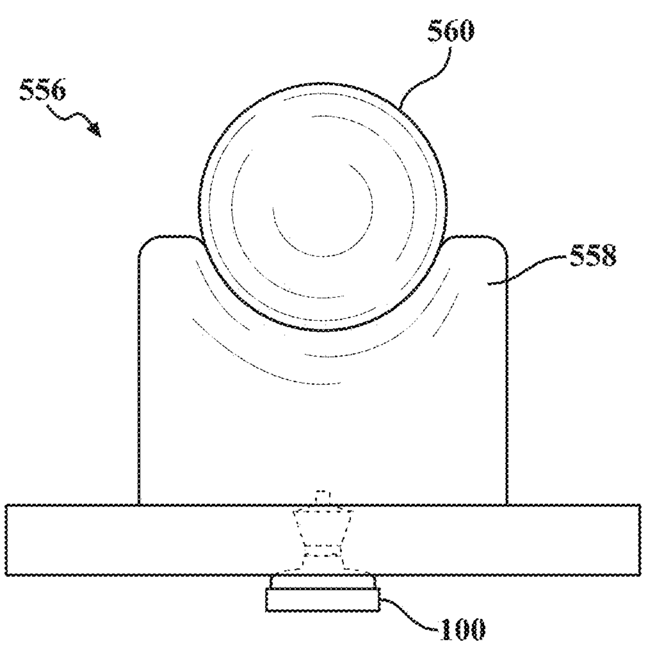
Figure 5C:
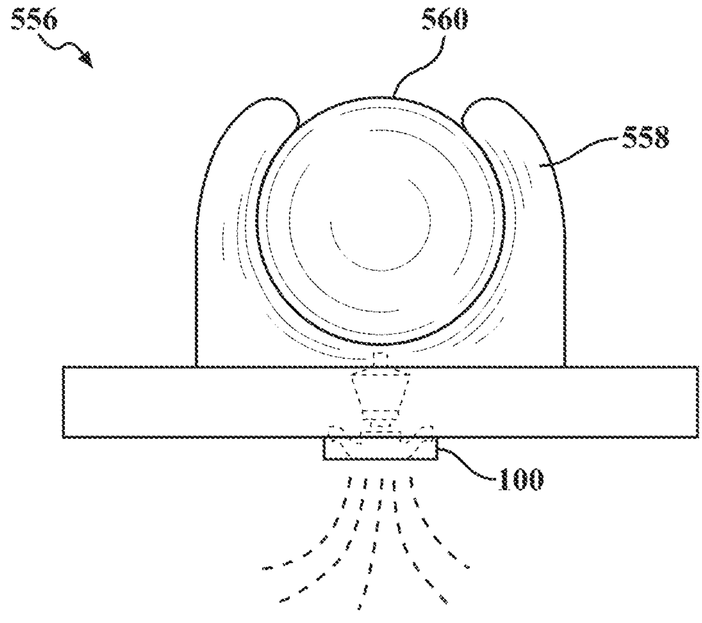
Figure 5D:
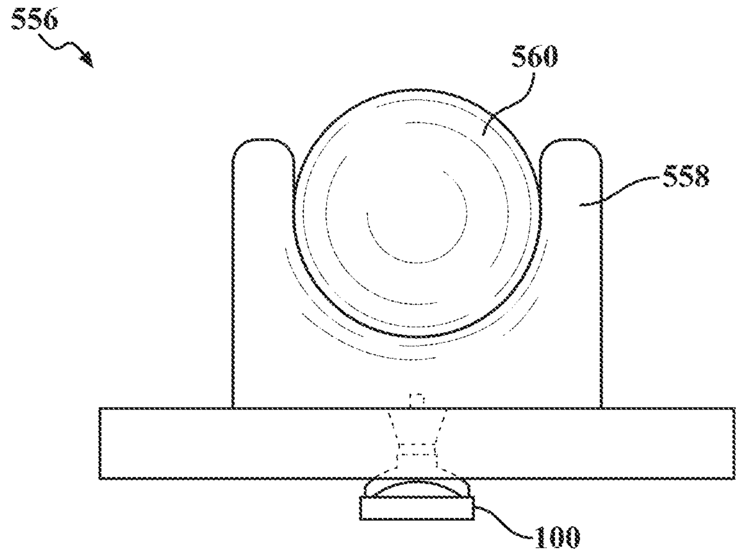
Figure 6:
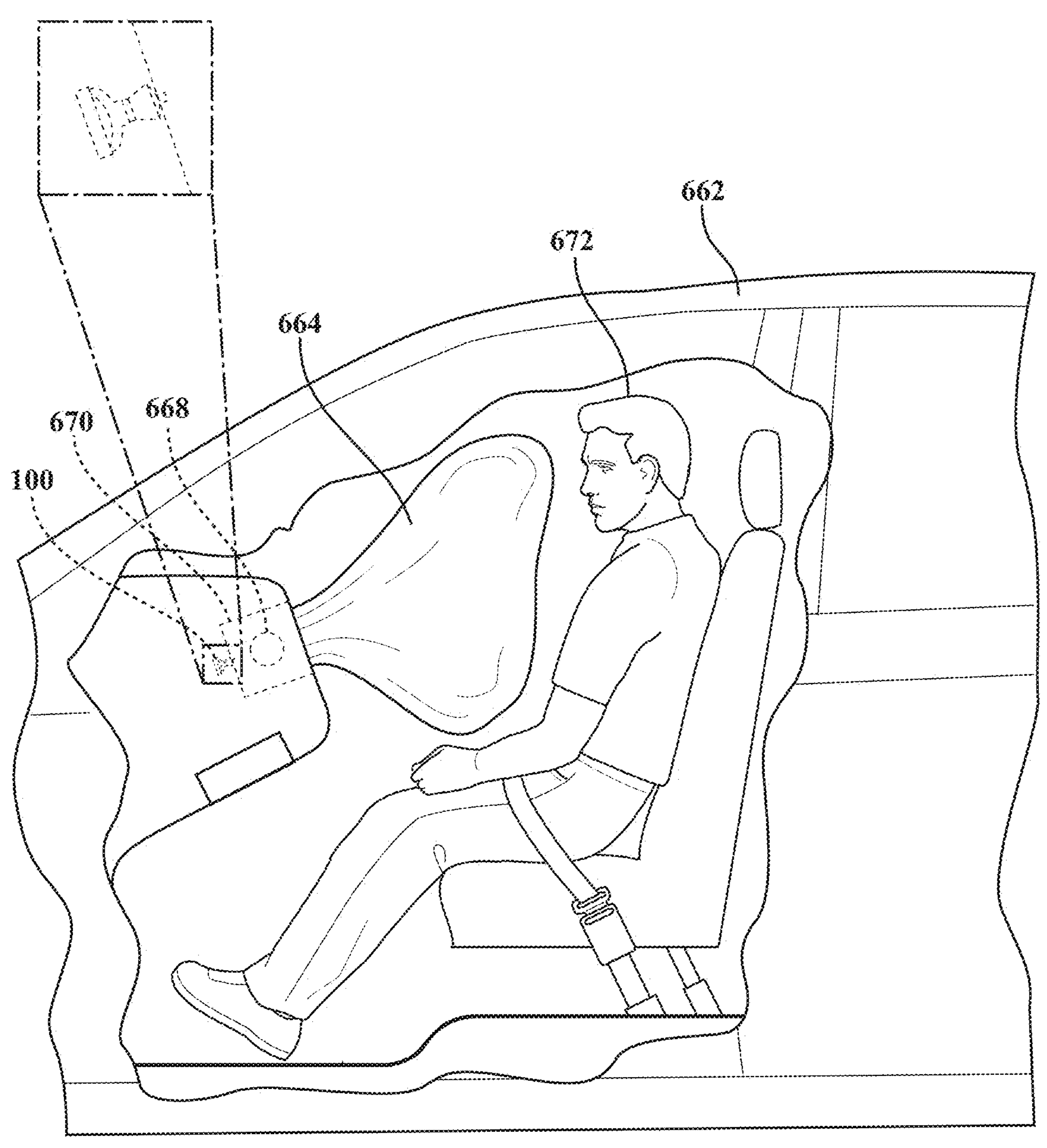
FIG. 6 depicts a vehicle airbag incorporating a pressure relief valve that exhibits snap-through buckling, according to an embodiment of the principles described herein.

As described above, the pressure relief valve 100 is a two-component device that regulates gas flow from an inflatable energy-absorbing body, such as an inflatable energy-absorbing vehicle airbag, as depicted in FIG. 6. The first component is a compressible hollow sleeve 102. In general, as depicted in FIGS. 5A-6, the compressible hollow sleeve 102 is in fluid communication with a body, such as an inflatable energy-absorbing body. This fluid communication may be facilitated in various ways. For example, an inlet 106 of the compressible hollow sleeve 102 may be mounted to the inflatable energy-absorbing body as depicted in FIGS. 5A-5D. In another example, as depicted in FIG. 6, the inlet 106 may be mounted to a housing along a fluid path of the inflatable energy-absorbing body. In either example, the compressible hollow sleeve 102 may be sealed to the inflatable energy-absorbing body or the housing to prevent gas leakage through a joint between the compressible hollow sleeve 102 and the inflatable energy-absorbing body. As such, the compressible hollow sleeve 102 has an inner channel. Responsive to a force within the body, as may occur when a passenger or object presses against the inflatable energy-absorbing body, gas flows through the inner channel and presses against a sealing plate 118 of the dome-shaped sealing body 104. In another example, gas may flow through the inner channel and press against the sealing plate 118, even before contact with a passenger.

Figure 2A:
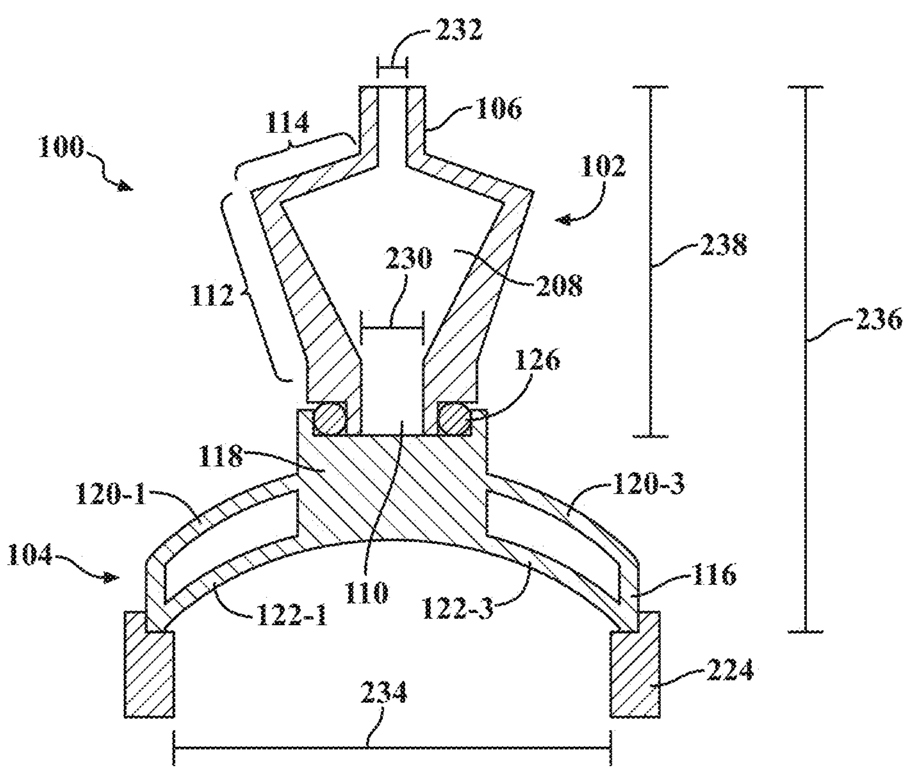
FIGS. 2A-2F are cross-sectional views of the pressure relief valve through various stages of operation, according to an embodiment of the principles described herein.
Figure 2B:
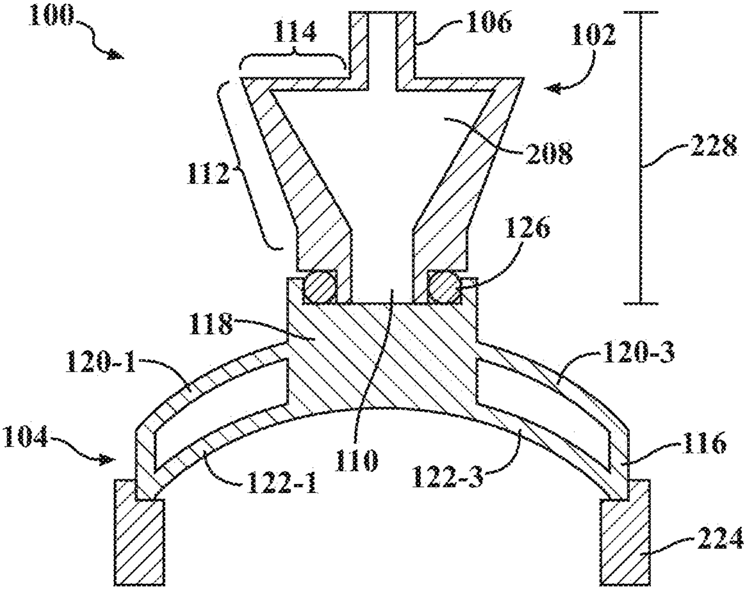
Figure 2C:
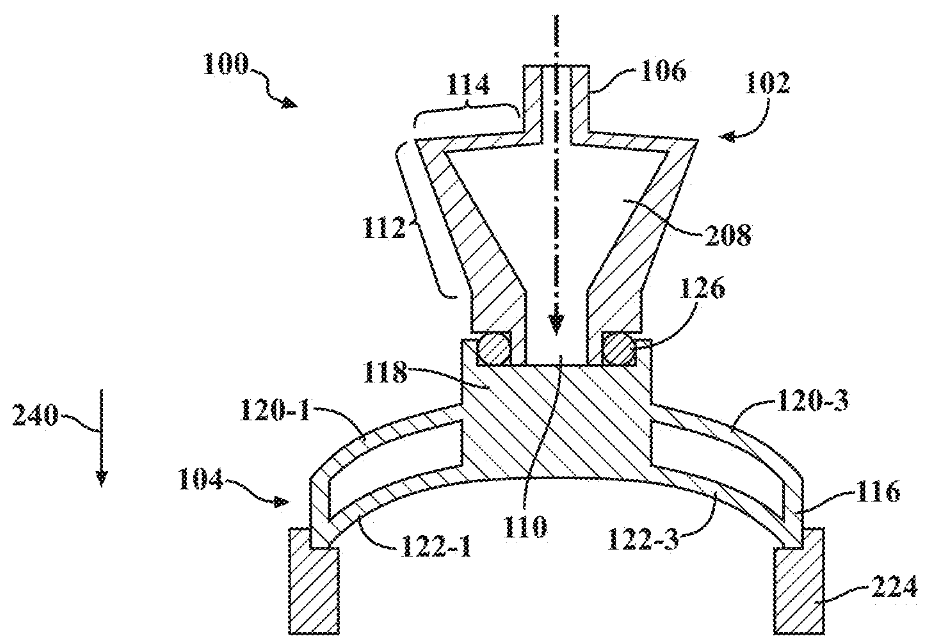
Figure 2D:
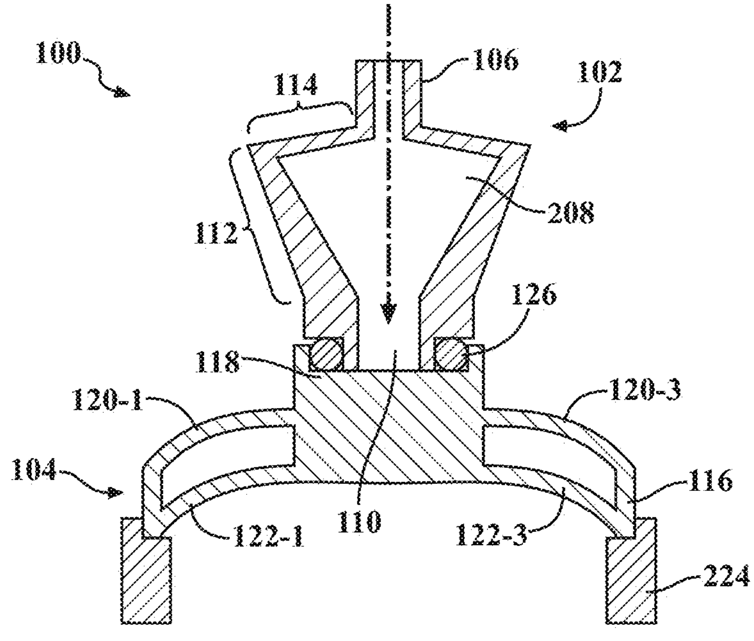
Figure 2E:
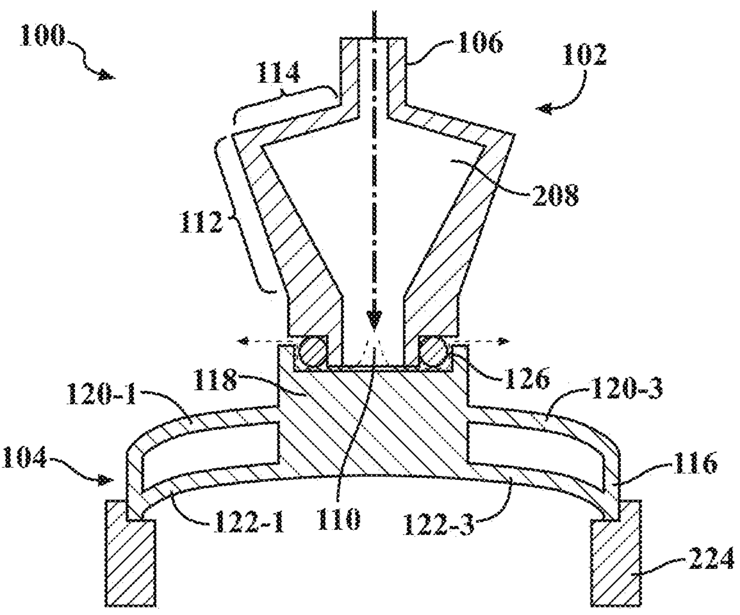
Figure 2F:
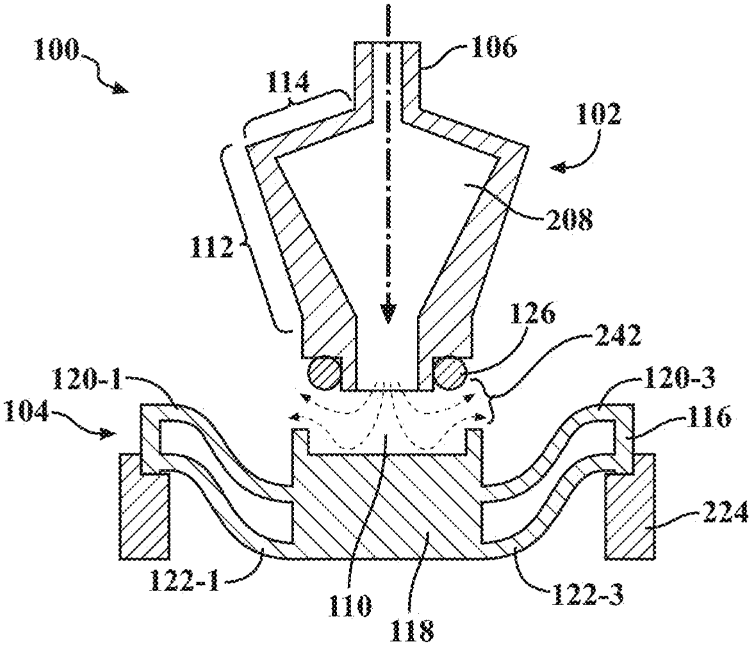

As depicted in FIGS. 1-2F, the compressible hollow sleeve 102 may be nozzle-shaped, having a narrow end and a larger end, with the walls of the compressible hollow sleeve 102 angling outwards from the narrow end. The outlet 110 of the inner channel, that is, the portion of the compressible hollow sleeve 102 through which gas escapes to the environment, may be disposed at the narrow end of the compressible hollow sleeve 102. The larger end, by comparison, may be adjacent to the inflatable energy-absorbing body to which the compressible hollow sleeve 102 is attached.

The compressible hollow sleeve 102 body may be divided into different portions, a first portion 112 of the compressible hollow sleeve 102 angles away from and extends axially away from the outlet 110 of the inner channel. The second portion 114 of the compressible hollow sleeve 102 is coupled to the first portion 112 and angles toward and extends axially towards the inlet 106 of the inner channel. This arrangement facilitates the preloading compression of the compressible hollow sleeve 102. For example, as depicted in FIG. 2A, the second portion 114 may be angled relative to the inlet 106. However, upon compression of the compressible hollow sleeve 102 during installation, as depicted in FIG. 2B, the second portion 114 may be generally perpendicular to the gas flow direction through inlet 106 and outlet 110 of the inner channel. This may pre-stress or preload the compressible hollow sleeve 102 against a sealing plate 118 of the dome-shaped sealing body 104. Upon initial deflection, as depicted in FIG. 2C, the second portion 114 returns to the unloaded and angled state. This ensures a seal between the compressible hollow sleeve 102 and the dome-shaped sealing body 104 during the initial deflection stages of the dome-shaped sealing body 104. That is, a seal is maintained at least until the point when the dome-shaped sealing body 104 reaches the snap-through deflection point.

This arrangement also prevents axial elongation of the compressible hollow sleeve 102 in response to internal pressure. Were the compressible hollow sleeve 102 allowed to axially elongate to an above-threshold amount, the compressible hollow sleeve 102 may remain in contact with the dome-shaped sealing body 104 for a longer period (for example, over the entire deflection range of the dome-shaped sealing body 104) and may also reduce the size of the gap between the compressible hollow sleeve 102 and the dome-shaped sealing body 104. Axial elongation, therefore, slows the rate at which the gap is provided and reduces the size of the gap. Accordingly, by structuring the compressible hollow sleeve 102 to reduce the amount of axial elongation to below a threshold amount, the pressure release valve 100 quickly provides an orifice that facilitates large flow rates. To prevent axial elongation, the compressible hollow sleeve 102 may avoid horizontal surfaces on which gas impinges (i.e., surfaces perpendicular to the gas flow out of the outlet 110). Note that the rate at which the orifice is provided may be tailored by adjusting material properties and/or dimensions of the compressible hollow sleeve 102 and other pressure relief valve 100 components.

To facilitate the compression of the compressible hollow sleeve 102 and the sealing of the outlet 110 against the dome-shaped sealing body 104, the compressible hollow sleeve 102 may be formed of an elastically deformable material, such as silicone, thermoplastic polyurethane, rubber, and in some cases plastics such as polyethylene, polypropylene, and acrylic. That is, the compressible hollow sleeve 102 may compress during pre-stress or preloading but may return to an original, uncompressed form during deployment when gas pressure within the body is greater than a predetermined threshold pressure.

The second component of the pressure relief valve 100 is a dome-shaped sealing body 104. In general, the dome-shaped sealing body 104 covers the outlet 110 of the compressible hollow sleeve 102 until a certain threshold pressure is reached. Once the pressure in the inflatable energy-absorbing body and the compressible hollow sleeve 102 pass the threshold pressure, the dome-shaped sealing body 104 is separated from the outlet 110 so gas escapes from the inflatable energy-absorbing body. In an example, the dome-shaped sealing body 104 may be structured to separate from the outlet 110 at a threshold pressure indicative that a moving object has contacted the inflatable energy-absorbing body. In another example, the dome-shaped sealing body 104 may separate from the outlet 110 at a lower threshold pressure than a contact-based threshold pressure. In either case, the threshold pressure at which the dome-shaped sealing body 104 separates from the outlet 110 may be tailored based on various situational criteria by adjusting the physical dimensions and properties of both components (e.g., the compressible hollow sleeve 102 and the dome-shaped sealing body 104).

The dome-shaped sealing body 104 is affixed to a rigid substrate. That is, the dome-shaped sealing body 104, which can deflect, may have a constant physical orientation and position relative to the compressible hollow sleeve 102. FIG. 1 also depicts an o-ring 126, which may be present between the compressible hollow sleeve 102 and the sealing plate 118 in some examples.

In addition to covering the outlet 110 of the inner channel, the dome-shaped sealing body 104 may be pressed against the outlet 110. This ensures that an airtight seal is maintained between the compressible hollow sleeve 102 and the dome-shaped sealing body 104, at least until the pressure within the inflatable energy-absorbing body reaches the threshold pressure. Were such a seal not maintained, gas from the inflatable energy-absorbing body may escape through the outlet 110 prior to the inflatable energy-absorbing body internal pressure reaching the threshold pressure. This may reduce the amount of energy the inflatable energy-absorbing body can absorb and/or alter the timing of the release of gas, which could negatively impact energy absorption. Accordingly, as depicted in FIG. 2B, the dome-shaped sealing body 104 may be pressed against the compressible hollow sleeve 102 during assembly. Given the relative stiffnesses of the compressible hollow sleeve 102 and the dome-shaped sealing body 104 (i.e., the dome-shaped sealing body 104 being stiffer than the compressible hollow sleeve 102), the compressible hollow sleeve 102 may be compressed while the dome-shaped sealing body 104 is uncompressed or has a nominal amount of compression as compared to the compressible hollow sleeve 102.

As described above, responsive to gas pressure through the compressible hollow sleeve 102 being greater than a threshold pressure, the dome-shaped sealing body deflects to expose the outlet 110, through which gas escapes the inflatable energy-absorbing body. That is, as a moving object contacts the inflatable energy-absorbing body, the pressure within the inflatable energy-absorbing body (and the compressible hollow sleeve 102, which is in fluid communication with the inflatable energy-absorbing body) rises. Once a certain pressure is reached, the force of the pressure deflects the arms 120 and 122 of the dome-shaped sealing body 104 to expose the outlet 110.

In a particular example, the dome-shaped sealing body 104 deflects with snap-through buckling. In general, snap-through buckling refers to the rapid nonlinear transition of a device between two positions responsive to an applied force, which in the present example is the increased gas pressure responsive to cushioning a moving object. This nonlinear transition ensures that the gas escape path is generated quickly and that the gas escape region is large, thus facilitating high gas flow rates, which ensures optimal energy absorption and dissipation.

The dome-shaped sealing body 104 generally includes an outer fixed ring 116. Via this outer fixed ring 116, the dome-shaped sealing body 104 is affixed to the rigid substrate adjacent to the inflatable energy-absorbing body. The dome-shaped sealing body 104 also includes a sealing plate 118 that presses against the outlet 110 when in a sealed position. As depicted in FIGS. 2A-2F, the sealing plate 118 is spaced apart from the outer fixed ring 116 in an axial direction of the outer fixed ring 116.

A number of circumferentially positioned arched arms 120-1, 120-2, 120-3, and 120-4 extend inward from the outer fixed ring 116 to the sealing plate 118. The arched shape of these arms 120-1, 120-2, 120-3, and 120-4 facilitates the snap-through deflection of the sealing plate 118 away from the outlet 110.

In an example, a uniform dome may not have symmetric deformation under a uniform applied pressure. This may lead to leakage between the outlet 110 and the sealing plate 118. The dome-shaped sealing body 104 is therefore constructed to achieve uniform deformation, specifically by using 1) a pattern of four distinct arched arms 120-1, 120-2, 120-3, and 120-4 instead of a uniform 360-degree dome and 2) a double arch as depicted in FIG. 1. The four distinct arched arms 120-1, 120-2, 120-3, and 120-4 promote symmetric deformation following snap through by minimizing hoop stress that may otherwise occur were the dome a uniform 360-degree dome.

The double arch structure also promotes uniform deformation. Accordingly, in an example, the dome-shaped sealing body 104 further includes a second number of circumferentially positioned arched arms 122-1, 122-2, 122-3, and 122-4. The second number of arched arms 122-1, 122-2, 122-3, and 122-4 extend inward from the outer fixed ring 116 and are connected to the sealing plate 118. Each of the second number of circumferentially positioned arched arms 122-1, 122-2, 122-3, and 122-4 are paired with and parallel to a corresponding arched arm 120-1, 120-2, 120-3, and 120-4 of the first number of circumferentially positioned arched arms 120-1, 120-2, 120-3, and 120-4. In these examples, the dome-shaped sealing body 104 can be structured to snap through at a predetermined threshold pressure by varying the geometry (thickness, height, diameters, etc.) of the arched arms 120-1, 120-2, 120-3, 120-4, 122-1, 122-2, 122-3, and 122-4 and the material of the arched arms 120-1, 120-2, 120-3, 120-4, 122-1, 122-2, 122-3, and 122-4.

As described above, the compressible hollow sleeve 102 and the dome-shaped sealing body 104 may both be formed of an elastically deformable material, albeit different materials. For example, the dome-shaped sealing body 104 may be formed of polyurethane or other materials, and the compressible hollow sleeve 102 may be formed of silicone. As described above, in some examples the dome-shaped sealing body 104 may be pressed against the outlet 110 by compressing the compressible hollow sleeve 102. It may be desirable that the majority of the preload displacement of the pressure relief valve 100 is exhibited in the compressible hollow sleeve 102 and that the dome-shaped sealing body 104 does not deflect or deflects to a comparatively nominal amount. Accordingly, the stiffness of the dome-shaped sealing body 104 may be greater than a stiffness of the compressible hollow sleeve 102. For example, the compressible hollow sleeve 102 may have a stiffness of between 0.2 to 5 Newtons per millimeter (N/mm), and the dome-shaped sealing body 104 may have a stiffness of between 2 to 50 N/mm Accordingly, the present pressure relief valve 100, exhibits snap-through buckling when a threshold pressure is reached, which threshold pressure may occur when a moving object, such as a passenger, begins to contact the inflatable energy-absorbing body or just before the passenger contacts the inflatable energy-absorbing body. Snap-through buckling provides large gas flow rates out of the inflatable energy-absorbing body quickly once the threshold pressure is reached. The threshold pressure at which the dome-shaped sealing body 104 snap-through buckles may vary based on the application and may be between 0.5 pounds per square inch (psi) and 10 psi. Once the pressure relief valve 100 is open, the pressure drop across the pressure relief valve 100 may be determined by the flow rate, which may be between 5 to 100 liters per second but may be lower in other applications.

FIGS. 2A-2F are cross-sectional views of the pressure relief valve 100 through various stages of operation, according to an embodiment of the principles described herein. Specifically, FIG. 2A depicts the pressure relief valve 100 in an unloaded state. As described above, the pressure relief valve 100 includes a compressible hollow sleeve 102 with an inlet 106 and outlet 110 connected by an inner channel 208. The inlet 106 may have a diameter 232 of between 8 and 20 millimeters (mm) and may be inserted into an inflatable energy-absorbing body, as depicted in FIGS. 5A-5D or inserted into a housing in fluid communication with the inflatable energy-absorbing body, as depicted in FIG. 6. In either case, gas (such as nitrogen, air, or other gases) within the inflatable energy-absorbing body can be directed through the inlet 106 to ultimately be discharged through the outlet 110. The outlet 110 may have a diameter 230 of between 8 and 20 millimeters (mm). This results in an outlet area of between 50 $mm^2$ to 314 $mm^2$. While particular reference is made to particular dimensions for the inlet 106 and outlet 110, the compressible hollow sleeve 102 may have inlets 106 and outlets 110 with different dimensions.

FIG. 2A also depicts the nozzle cross-sectional shape of the compressible hollow sleeve 102 with the first portion 112 angling away from and extending away from the outlet 110 while the second portion 114 angles toward and extends towards the inlet 106.

As depicted in FIG. 2B, the angling of these walls, in addition to preventing axial elongation during deployment, facilitates preloading the pressure relief valve 100 and sealing the outlet 110 to prevent pre-deployment gas escape from the inflatable energy-absorbing body.

In an example, the unloaded height 236 of the pressure relief valve 100 may be between 35 and 75 millimeters (mm), and the unloaded height 238 of the compressible hollow sleeve 102 may be between 10 and 35 (mm).

FIG. 2A depicts a cross-sectional view of the dome-shaped sealing body 104 with the outer fixed ring 116 and sealing plate 118. FIG. 2A also clearly depicts the axial offset between the outer fixed ring 116 and the sealing plate 118 and the connecting arched arms 120-1, 120-3, 122-1, and 122-3 that facilitate the uniform snap-through buckling of the sealing plate 118. That is, the fixed outer ring 116 is at a greater vertical height (from the perspective of FIG. 2B) along the dome-shaped sealing body 104 than the connecting arched arms 120-1, 120-3, 122-1, and 122-3. In an example, the dome-shaped sealing body 104 may have a diameter 234 of between 20 and 50 mm. Note that while particular reference is made to particular dimensions for both the compressible hollow sleeve 102 and the dome-shaped sealing body 104, these components may have different dimensions, which different dimensions may dictate the threshold pressure that triggers the snap-through opening of the pressure relief valve 100.

As described above, the outer fixed ring 116 may be affixed to a rigid substrate 224 and may be prevented from translating or moving in a direction parallel to gas flow through the inner channel 208. In an example, the rigid substrate 224 may be a part of the energy-absorbing system or may be mounted to a device that is adjacent to the energy-absorbing system. FIG. 2A also depicts the o-ring 126, which may be present between the compressible hollow sleeve 102 and the sealing plate 118 in some examples.

As described above, the compressible hollow sleeve 102, formed of an elastically deformable material, provides a soft, elastic contact with the sealing plate 118 of the dome-shaped sealing body 104 to maintain a seal before the pressure relief valve 100 opens. As depicted in FIG. 2B, the pressure relief valve 100 is preloaded. Specifically, the compressible hollow sleeve 102 and the dome-shaped sealing body 104 are pressed together during assembly. This may occur in various ways, such as compressing the pressure relief valve 100 to fit within an installation space (e.g., within the gap between the inflatable energy-absorbing body and the rigid substrate 224.

As described above, it may be that the compressible hollow sleeve 102 has a smaller stiffness than the dome-shaped sealing body 104. Accordingly, all or a large portion of the preload displacement of the pressure relief valve 100 is found within the compressible hollow sleeve 102, and the preload displacement of the dome-shaped sealing body 104 is small or zero. This prevents air leakage before the snap-through event as the dome-shaped sealing body 104 and the compressible hollow sleeve 102 will remain in contact up to, and even slightly past, the snap-through point due to the pre-load.

Following preload, the compressible hollow sleeve 102 may have a preloaded height 228 between 5 and 30 mm. The preload displacement of the compressible hollow sleeve 102, therefore, is defined as the difference between the preloaded height 228 and the unloaded height 238 of the compressible hollow sleeve 102, which preload displacement may be between 1.5 mm and 8.5 mm. This preloaded arrangement is facilitated by the material properties of the compressible hollow sleeve 102 and the physical structure of the compressible hollow sleeve 102. For example, as depicted in FIG. 2B, the second portion 114 of the compressible hollow sleeve 102 is no longer angled but is flat or parallel to the sealing plate 118. In this arrangement, the compressible hollow sleeve 102 is a spring storing the preload energy.

In an example, the preload displacement of the compressible hollow sleeve 102 may be greater than the snap-through displacement of the dome-shaped sealing body 104, the snap-through displacement being the displacement exhibited by the dome-shaped sealing body 104 when snap-through occurs. Were the preload displacement of the compressible hollow sleeve 102 less than the snap-through displacement of the dome-shaped sealing body 104, a gap may form between the compressible hollow sleeve 102 and the dome-shaped sealing body 104 before the pressure relief valve 100 is intended to be open. The presence of this gap may reduce the pressure against the sealing plate 118 and thus alter the timing of when the dome-shaped sealing body 104 fully separates or snaps through to the deflected position. Accordingly, with a preload displacement of the compressible hollow sleeve 102 that is greater than the snap-through displacement of the dome-shaped sealing body 104, the compressible hollow sleeve 102 and the dome-shaped sealing body 104 remain in contact at least through the snap-through point, thus maintaining a seal and preventing leakage.

Note that in this example, the preload displacement of the compressible hollow sleeve 102 may be less than the total displacement of the dome-shaped sealing body 104. Were the preload displacement greater than the total displacement of the dome-shaped sealing body 104, the sealing plate 118 may cover at least a portion of the outlet 110, even when in the deflected position. This would reduce the gas flow rate away from the inflatable energy-absorbing body, thus reducing the energy absorption characteristics of the energy-absorption system.

FIG. 2C depicts the pressure relief valve 100 at a stage where pressure begins to be exerted against the sealing plate 118, but not so great as to cause snap-through buckling of the dome-shaped sealing body 104. As depicted in FIG. 2C, the second portion 114 of the compressible hollow sleeve 102 begins to rebound towards the unloaded position. That is, the gas pressure increase, which results from the contact of the moving object with the inflatable energy-absorbing body, begins to push against and deflect the dome-shaped sealing body 104 in a direction indicated by the arrow 240. FIG. 2C may represent the pressure relief valve 100 in a state where the moving object (e.g., a passenger in a vehicle) begins to contact and press against the inflatable energy-absorbing body.

FIG. 2D depicts the pressure relief valve 100 at a further stage where pressure continues to build against the sealing plate 118, but not so great as to cause snap-through buckling of the dome-shaped sealing body 104. As depicted in FIG. 2D, the second portion 114 of the compressible hollow sleeve 102 continues to rebound towards the unloaded position, and the dome-shaped sealing body 104 continues to deflect. Note that due to the preload of the compressible hollow sleeve 102 and the spring-like action of the compressible hollow sleeve 102 toward the unloaded position, the compressible hollow sleeve 102 remains in contact with the sealing plate 118, thus preventing pressure-reducing leakage of gas and ensuring predictable energy-absorbing properties for the system.

Figure 3A:
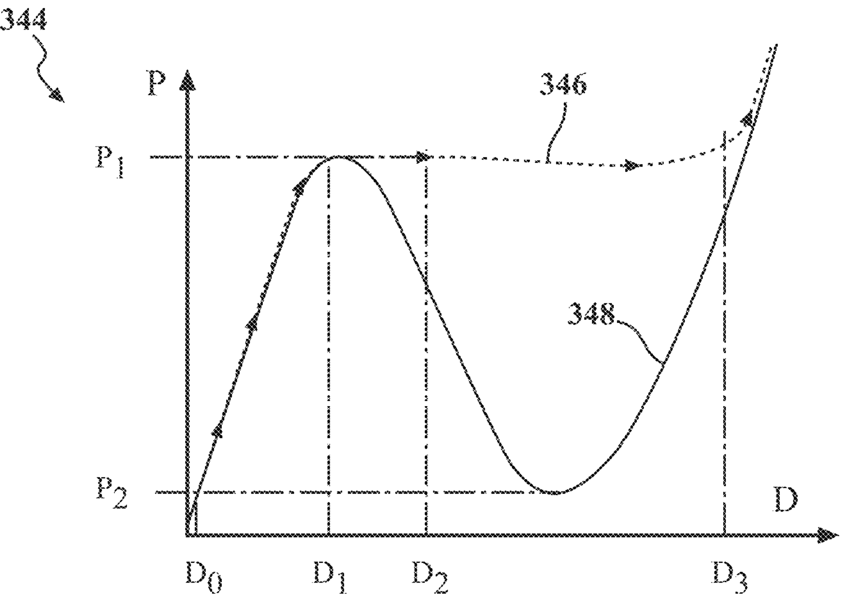
FIGS. 3A and 3B depict loading and unloading curves for the pressure relief valve that exhibits snap-through buckling, according to an embodiment of the principles described herein.

FIG. 2E depicts the pressure relief valve 100 immediately following the initiation of snap-through. Specifically, FIG. 2E depicts the pressure relief valve 100 at a stage $D_2$, as depicted in FIG. 3A. At this point, the dome-shaped sealing body 104 has begun to deflect via snap-through buckling. As depicted in FIG. 2E, a gap between the compressible hollow sleeve 102 and the dome-shaped sealing body 104 may begin to form such that gas may begin to flow through the pressure relief valve 100. As described above, the preload displacement of the compressible hollow sleeve 102 may be such that compressible hollow sleeve 102 and the dome-shaped sealing body 104 remain in contact until just after the snap-through point, a point in time depicted in FIG. 2E. Initiating separation at this point ensures that a large orifice is provided early relative to the snap-through point.

Lastly, FIG. 2F depicts the pressure relief valve 100 in a fully open position and the dome-shaped sealing body 104 in a deflected position. Between the configuration depicted in FIG. 2E and the configuration depicted in FIG. 2F, the dome-shaped sealing body 104 exhibits snap-through buckling. As described above, snap-through buckling includes the rapid nonlinear transition of a body from one position (i.e., the position depicted in FIG. 2E) to another (i.e., the position depicted in FIG. 2F). With reference to FIG. 3A, this snap-through point may correspond to the point $D_3$. This snap-through buckling is facilitated by the arched arms 120-1, 120-2, 120-3, 120-4, 122-1, 122-2, 122-3, and 122-4. As a result, a gap 242 is provided between the compressible hollow sleeve 102 and the dome-shaped sealing body 104. In an example, the gap 242 may be between 3 mm and 15 mm. Thus, the gas can escape at a high flow rate, which may facilitate enhanced energy absorption by ensuring a soft energy-dissipating surface to cushion a moving object, such as the head of a vehicle passenger.

Following the initial deployment of the pressure relief valve 100, the action of the pressure relief valve 100 may depend on the type of the pressure relief valve 100. That is, the pressure relief valve 100 may be a bi-stable pressure relief valve or a mono-stable pressure relief valve. In one example, the dome-shaped sealing body 104 is a bi-stable device that is in a stable state in the deflected position depicted in FIG. 2F. In this example, when gas pressure through the compressible hollow sleeve 102 falls below a second threshold pressure, the dome-shaped sealing body 104 may remain in the deflected position, spaced apart from the outlet 110 as depicted in FIG. 2F. In this example, the dome-shaped sealing body 104 may remain spaced apart from, and thus not sealing, the outlet 110 of the compressible hollow sleeve 102 until manually re-set, for example, by pushing the sealing plate 118 into the sealed position. In this case, the inflatable energy-absorbing body may be completely deflated. This may be desirable, for example, when the inflatable energy-absorbing body is a vehicle airbag. That is, full evacuation of the airbag may be desirable to allow passengers of the vehicle to exit the vehicle.

In another example, the dome-shaped sealing body 104 may be a mono-stable device that is in an unstable state in the deflected position depicted in FIG. 2F. In this example, when gas pressure through the compressible hollow sleeve 102 falls below the second threshold pressure, the dome-shaped sealing body 104 may return to a sealed position against the outlet 110, as depicted in FIG. 2B. This may be used in a situation where it is desirable to maintain a certain amount of gas within the inflatable energy-absorbing body, as depicted in FIG. 5A-5D to retain an object. Put another way, if the pressure relief valve 100 is bi-stable, it will not automatically return to the sealed position. If the pressure relief valve 100 is mono-stable, it will close once the pressure drops below a second threshold pressure. Additional details regarding the threshold pressures and displacements of the pressure relief valve 100 are provided in FIGS. 3A and 3B.

Figure 3B:
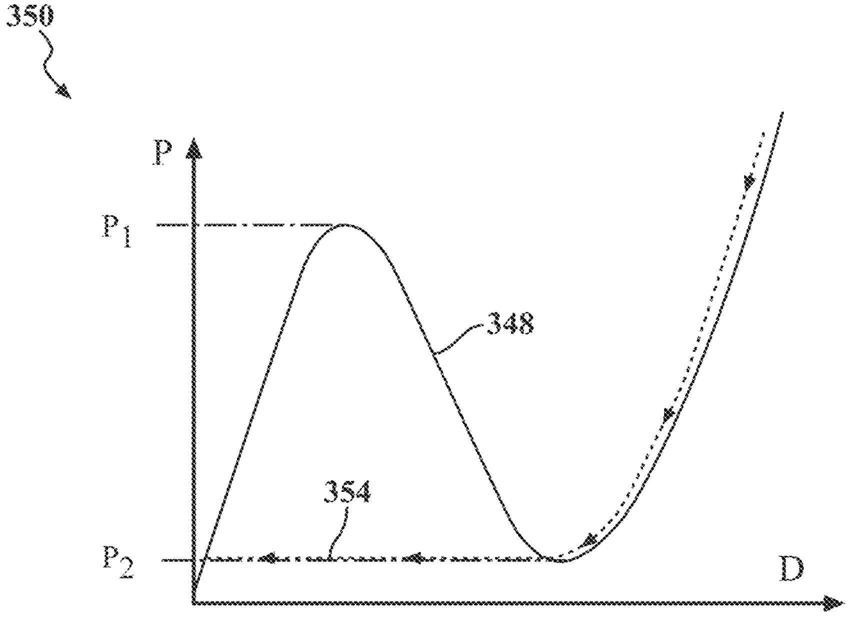

FIGS. 3A and 3B depict the loading and unloading curves for the pressure relief valve 100 exhibiting snap-through buckling, according to an embodiment of the principles described herein. Specifically, FIG. 3A is a loading curve graph 344 that depicts the loading curve for the pressure relief valve 100 and FIG. 3B is an unloading curve graph 350 that depicts the unloading curve for the pressure relief valve 100. In these graphs, the x-axis represents the location of the dome-shaped sealing body 104 (with a displacement indicated by a difference between points along the x-axis), and the y-axis represents the pressure on the sealing plate 118 of the dome-shaped sealing body 104. That is, the y-axis may represent a compression of the dome-shaped sealing body 104, which may indicate the displacement of less any displacement of the rigid substrate 224. FIGS. 3A and 3B depict the nonlinear transition of the dome-shaped sealing body 104 from a sealed position depicted in FIG. 2B to the deflected position depicted in FIG. 2F. For any structure with a negative stiffness, such as the dome-shaped sealing body 104, the structure will follow the second curve 348 if displacement is controlled. Whereas, if the pressure is controlled, as is the case with the two-piece snap-through pressure relief valve 100 of the present specification, the structure will follow the first curve 346.

As depicted, the dome-shaped sealing body 104 may have an initial pre-loaded displacement of zero or a small non-zero value, indicated at location Do in the loading curve graph 344. FIG. 2B depicts the dome-shaped sealing body 104 in this state. As the pressure against the sealing plate 118 rises (i.e., increasing from zero toward $P_1$) on account of increased gas pressure in the body resulting from the deformation of the body by the object force, the dome-shaped sealing body 104 may exhibit small displacement (i.e., increasing from zero toward $D_1$). Once the pressure against the sealing plate 118 of the dome-shaped sealing body 104 reaches a predetermined threshold pressure, $P_1$, the pressure-deflection behavior of the dome-shaped sealing body 104 follows the first curve 346. At this point, the dome-shaped sealing body 104 has exhibited a first amount of displacement (i.e., $D_1$-$D_0$).

At this point, which may be referred to as the snap-through point ($P_1$, $D_1$), the dome-shaped sealing body 104 may exhibit snap-through buckling. That is, the dome-shaped sealing body may experience a large displacement (i.e., $D_3$-$D_1$) in a short period. This is depicted in the present specification as the transition from the state depicted in FIG. 2E to the state depicted in FIG. 2F. An example predetermined threshold pressure, $P_1$ or snapthrough pressure, where this nonlinear transition occurs, may be between 0.5 and 10 pounds per square inch (psi), and the snap-through point $D_1$, may be between 1 mm and 10 mm. This displacement (i.e., $D_3$-$D_1$) creates an orifice in the pressure relief valve 100 that can accommodate large gas flow rates. Furthermore, this displacement occurs quickly due to the snap-through instability of the dome-shaped sealing body 104 as the pressure increases beyond $P_1$, Therefore, the pressure relief valve 100 can respond quickly to an applied force.

As described above, the preload displacement of the compressible hollow sleeve 102 may be greater than the snap-through displacement (i.e., $D_1$-$D_0$) of the dome-shaped sealing body 104. For example, this preload displacement may be defined as $D_2$ minus $D_0$, such that the sealing plate 118 is still in contact with the outlet 110 at the point $D_1$ but pulls away from the outlet 110 at a point $D_2$ on the unloading curve graph 350. This ensures a seal just beyond the snap-through point ($P_1$, $D_1$), which enhances the energy-absorbing characteristics of the energy-absorbing system. Note that the loading curve graph 344 may be the same for a mono-stable dome-shaped sealing body 104 and a bi-stable dome-shaped sealing body 104.

As described above, the dome-shaped sealing body 104 may return to the sealed position depicted in FIG. 2B, when the pressure falls below a second predetermined threshold pressure, $P_2$, as depicted in the unloading curve graph 350. As the pressure against the sealing plate 118 of the dome-shaped sealing body 104 falls due to the discharged gas, the dome-shaped sealing body 104 may exhibit small displacement (along the x-axis). Once the pressure against the dome-shaped sealing body 104 falls below a second predetermined threshold pressure, $P_2$, the pressure-deflection behavior of the dome-shaped sealing body 104 follows the third curve 354. At this point, which may be referred to as the return snap-through point, the dome-shaped sealing body 104 may experience a large displacement from $D_3$ to Do. That is, the dome-shaped sealing body 104 may return from a deflected position at $D_3$ to a sealed position at Do.

Note that in this example, the second predetermined threshold pressure, $P_2$, where the return snap-through occurs, may vary between mono- and bi-stable dome-shaped sealing bodies. For example, $P_2$ for a bi-stable dome-shaped sealing body 104 may be less than 0. That is to say, the bi-stable dome-shaped sealing body 104 may not return to the sealed position unless acted upon by an external force or negative pressure. By comparison, $P_2$ for a mono-stable dome-shaped sealing body 104 may be any value greater than zero, which may be selected based on the use and which may dictate the physical and structural properties of the pressure relief valve 100 components.

Figure 4:
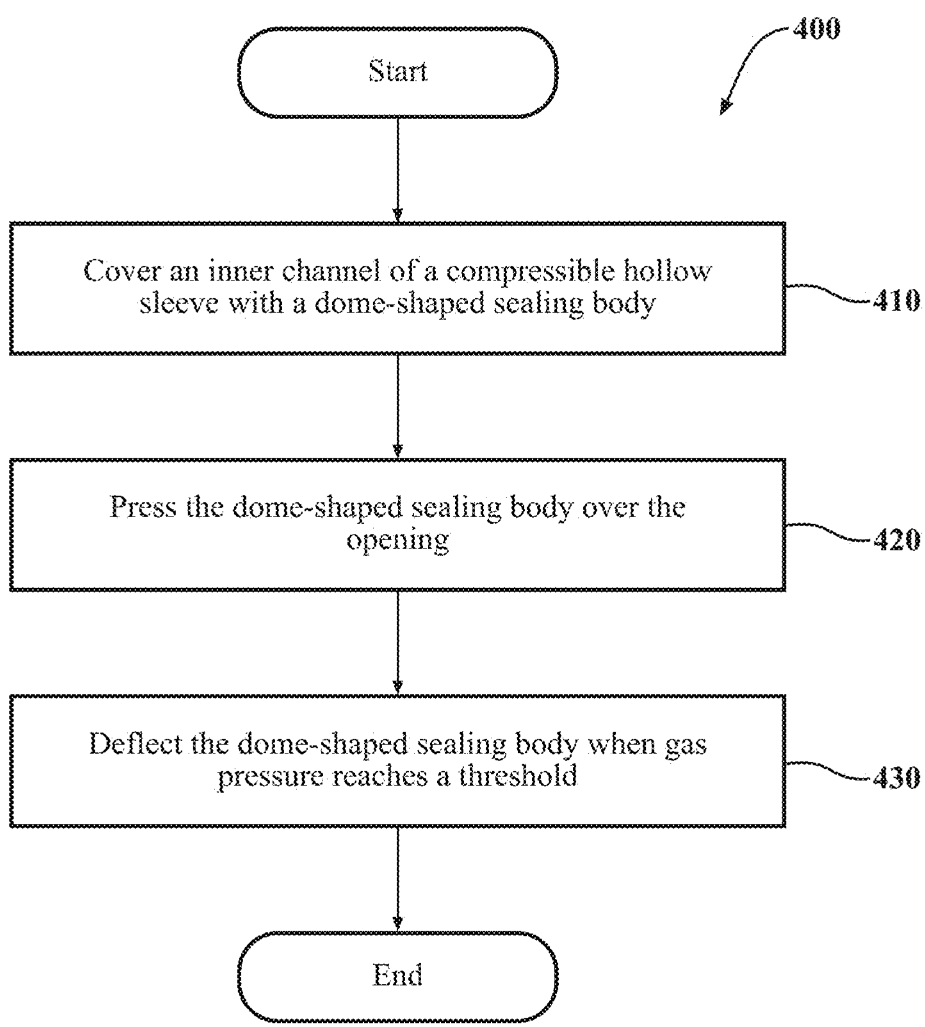
FIG. 4 is a flowchart of a method for deploying a pressure relief valve that exhibits snap-through buckling, according to an embodiment of the principles described herein.

Additional aspects of operating the pressure relief valve 100 will be discussed in relation to FIG. 4. At 410, the outlet 110 of an inner channel 208 of a compressible hollow sleeve 102 is covered by a dome-shaped sealing body 104. Specifically, the dome-shaped sealing body 104, at 420, is pressed against the outlet 110 to compress the spring-like elastically deformable compressible hollow sleeve 102. This covering and pre-loading ensures that the desired gas pressure is maintained within the inflatable energy-absorbing body during energy dissipation and facilitates the snap-through rapid exposure of a discharge gas flow path. The preloading may be performed in various ways, such as by pressing the compressible hollow sleeve 102 and the dome-shaped sealing body 104 against one another.

At 430, responsive to gas pressure through the compressible hollow sleeve 102 being greater than a threshold pressure, $P_1$, the dome-shaped sealing body 104 is deflected with snap-through buckling to expose the outlet 110 through which gas escapes. That is, as a moving object, such as a passenger's body in a vehicle, presses against an inflatable energy-absorbing body, the pressure within the inflatable energy-absorbing body increases. Once the increase in pressure passes a predetermined point, it may be desirable to discharge at least part of the gas to enhance the energy absorption or dissipation of the inflatable energy-absorbing body. The pressure relief valve 100 opens rapidly at this predetermined point, generating a large orifice or flow path for the gas. Thus, the pressure relief valve 100 of the present specification provides customized energy-absorbing enhancements to an energy-absorbing system.

FIGS. 5A-5D depict an energy-absorbing device 556 incorporating a pressure relief valve 100, according to an embodiment of the principles described herein. Specifically, the energy-absorbing device 556 includes an inflatable energy-absorbing body 558, which captures or catches an object 560. The energy-absorbing device 556 also includes a pressure relief valve 100 mounted to the inflatable energy-absorbing body 558. As described above, the pressure relief valve 100 is in fluid communication with the inflatable energy-absorbing body 558 and includes components to ensure the controlled release of gas from the energy-absorbing inflatable energy-absorbing body 558 to promote energy absorption and dissipation. Note that in the examples depicted in FIGS. 5A-5D and 6, the pressure relief valve 100 is not drawn to scale, but rather is enlarged to show details.

In this example, it may be desirable for the energy-absorbing device 556 to retain a portion of the gas within the inflatable energy-absorbing body 558 to capture and hold the object 560. As such, the pressure relief valve 100 in this example may be mono-stable, meaning that the dome-shaped sealing body 104 may return to a sealing position when the pressure within the inflatable energy-absorbing body 558 falls below a non-zero second threshold pressure, $P_2$. As depicted in FIG. 5A, the inflatable energy-absorbing body 558 may have been deployed at a certain time before interaction with the object 560. That is, the inflatable energy-absorbing body 558 may be statically inflated or dynamically inflated responsive to some indication that an impact is imminent. In either case, the pressure relief valve 100 is sealed and preloaded, as depicted in FIG. 2B as the object 560 travels towards the inflatable energy-absorbing body 558.

As depicted in FIG. 5B, as the object 560 falls into the inflatable energy-absorbing body 558, the pressure within the inflatable energy-absorbing body 558 begins to rise. However, in the example depicted in FIG. 5B, the pressure within the inflatable energy-absorbing body 558 may not yet be greater than the predetermined threshold pressure, $P_1$, that triggers activation of the pressure relief valve 100.

As depicted in FIG. 5C, as the object 560 falls further into the inflatable energy-absorbing body 558, the pressure within the inflatable energy-absorbing body 558 continues to rise. At the stage depicted in FIG. 5C, the pressure within the inflatable energy-absorbing body 558 may be greater than the predetermined threshold pressure, $P_1$, that triggers the activation of the pressure relief valve 100. As such, the dome-shaped sealing body 104 of the pressure relief valve 100 snaps through to the deflected position, as depicted in FIG. 2F to expel gas and continue to absorb the energy of the object 560 and slow the object 560 movement.

As depicted in FIG. 5D, the object 560 has come to rest. Also, as depicted in this figure, the pressure within the inflatable energy-absorbing body 558 has fallen below the second predetermined threshold pressure $P_2$, which, as described above, is a non-zero value. That is, the pressure relief valve 100 is a mono-stable device such that when the pressure within the inflatable energy-absorbing body 558 falls below the second predetermined threshold pressure, $P_2$, the dome-shaped sealing body 104 of the pressure relief valve 100 returns to the sealed position. Note that as $P_2$ is a non-zero number, a certain amount of gas pressure still exists within the inflatable energy-absorbing body 558, even after capturing and absorbing the energy of the object 560. As such, the object 560 may remain captured within the inflatable energy-absorbing body 558, which still includes cushioning gas.

FIG. 6 depicts a vehicle airbag 664 incorporating a pressure relief valve 100 that exhibits snap-through deflection, according to an embodiment of the principles described herein. That is, in this example, the inflatable energy-absorbing body is an airbag 664 in a vehicle 662. Generally, an airbag system includes a housing 670 that retains an inflator 668 and a compressed airbag 664. When sensors of the vehicle 662 detect a collision or an impending collision, the inflator 668 is actuated to deploy the airbag 664 from the housing 670. In this example, the pressure relief valve 100 of the present specification may be mounted to the housing 670 instead of the airbag 664. Still, in this example, the pressure relief valve 100 is in fluid communication with the energy-absorbing inflatable energy-absorbing body (e.g., the airbag 664).

In this example, it may be desirable for the airbag 664 to be wholly deflated following deployment of the pressure relief valve 100 to allow the occupant 672 of the vehicle 662 to quickly exit the vehicle 662 and/or to allow emergency personnel access to the occupant 672. As such, the pressure relief valve 100 in this example may be bi-stable, meaning that the dome-shaped sealing body 104 may remain in the deflected position when the pressure within the airbag 664 is nominal. That is, the second threshold pressure $P_2$ for a bi-stable pressure relief valve 100 may be a negative value.

As depicted in FIG. 6, the airbag 664 may have been deployed responsive to a detected or impending collision. As the occupant 672 falls into the airbag 664, responsive to the force of a collision, the pressure within the airbag 664 begins to rise. When the pressure within the airbag 664 becomes greater than the predetermined threshold pressure, $P_1$, that triggers the activation of the pressure relief valve 100, the dome-shaped sealing body 104 of the pressure relief valve 100 snaps through to the deflected position as depicted in FIG. 2F to expel gas and continue to absorb the energy of the occupant 672 and slow their movement.

Because the pressure relief valve 100 in this example is a bi-stable device, after the occupant 672 has come to rest and the airbag 664 is deflated, the dome-shaped sealing body 104 of the pressure relief valve 100 remains in the deflected position depicted in FIG. 2F. As such, the airbag 664 has a nominal pressure and does not hinder the occupant 672 or emergency personnel trying to reach the occupant 672.

In this way, the disclosed systems, methods, and other embodiments improve the energy absorption of inflatable bodies. By having a pressure relief valve that can open quickly at a customized predetermined pressure, the present pressure relief valve can increase the energy-absorption features of an energy-absorbing system without requiring larger or additional inflators and/or larger or additional inflatable bodies. Moreover, the pressure relief valve of the present specification reduces a spring back or rebound effect and is customizable to deploy at a particular flow rate, further enhancing the safety-providing characteristics of the system.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A pressure relief valve, comprising:

a compressible hollow sleeve comprising an inner channel in fluid communication with an inflatable energy-absorbing body; and a dome-shaped sealing body, affixed to a rigid substrate, pressed against and covering an outlet of the inner channel, responsive to gas pressure through the compressible hollow sleeve being greater than a threshold pressure, the dome-shaped sealing body deflects with snap-through buckling to expose the outlet through which gas escapes.

2. The pressure relief valve of claim 1, wherein:

the compressible hollow sleeve is nozzle-shaped;

the outlet is disposed at a narrow end of the compressible hollow sleeve;

a first portion of the compressible hollow sleeve angles away from and extends away from the outlet; and a second portion of the compressible hollow sleeve coupled to the first portion angles toward and extends toward an inlet of the compressible hollow sleeve.

3. The pressure relief valve of claim 1, wherein the dome-shaped sealing body comprises:

an outer fixed ring;

a sealing plate that presses against the outlet when in a sealed position and that is spaced apart from the outer fixed ring in an axial direction of the outer fixed ring; and a first number of circumferentially positioned arched arms extending inward from the outer fixed ring and connected to the sealing plate.

4. The pressure relief valve of claim 3, wherein:

the dome-shaped sealing body further comprises a second number of circumferentially positioned arched arms extending inward from the outer fixed ring and connected to the sealing plate; and each of the second number of circumferentially positioned arched arms is paired with and parallel to a corresponding arched arm of the first number of circumferentially positioned arched arms.

5. The pressure relief valve of claim 1, wherein:

the compressible hollow sleeve and the dome-shaped sealing body are formed of elastically deformable materials; and a stiffness of the dome-shaped sealing body is greater than a stiffness of the compressible hollow sleeve.

6. The pressure relief valve of claim 1, wherein:

the dome-shaped sealing body is a bi-stable device that is in a stable state in a deflected position; and when the gas pressure through the compressible hollow sleeve falls below a second threshold pressure, the dome-shaped sealing body remains in the deflected position spaced apart from the outlet.

7. The pressure relief valve of claim 1, wherein:

the dome-shaped sealing body is a mono-stable device that is in an unstable state in a deflected position; and when the gas pressure through the compressible hollow sleeve falls below a second threshold pressure, the dome-shaped sealing body returns to a sealed position against the outlet.

8. The pressure relief valve of claim 1, wherein a preload displacement of the compressible hollow sleeve is greater than a snap-through displacement of the dome-shaped sealing body.

9. An energy-absorbing device, comprising:

an inflatable energy-absorbing body; and a pressure relief valve, comprising:

a compressible hollow sleeve comprising an inner channel in fluid communication with the inflatable energy-absorbing body; and a dome-shaped sealing body, affixed to a rigid substrate, pressed against and covering an outlet of the inner channel, responsive to a gas pressure through the compressible hollow sleeve being greater than a threshold pressure, the dome-shaped sealing body deflects with snap-through buckling to expose the outlet through which gas escapes.

10. The energy-absorbing device of claim 9, wherein the inflatable energy-absorbing body is an airbag in a vehicle.

11. The energy-absorbing device of claim 9, wherein the pressure relief valve is mounted to the inflatable energy-absorbing body.

12. The energy-absorbing device of claim 9, wherein the pressure relief valve is mounted to a housing along a fluid path of the inflatable energy-absorbing body.

13. The energy-absorbing device of claim 9, wherein:

the compressible hollow sleeve is nozzle-shaped;

the outlet is disposed at a narrow end of the compressible hollow sleeve;

a first portion of the compressible hollow sleeve angles away from and extends away from the outlet; and a second portion of the compressible hollow sleeve coupled to the first portion angles toward and extends toward an inlet of the compressible hollow sleeve.

14. The energy-absorbing device of claim 9, wherein the dome-shaped sealing body comprises:

an outer fixed ring;

a sealing plate that presses against the outlet when in a sealed position and that is spaced apart from the outer fixed ring in an axial direction of the outer fixed ring; and a number of circumferentially positioned parallel arched arms extending inward from the outer fixed ring and connected to the sealing plate.

15. The energy-absorbing device of claim 9, wherein:

the dome-shaped sealing body is a bi-stable device that is in a stable state in a deflected position; and when the gas pressure through the compressible hollow sleeve falls below a second threshold pressure, the dome-shaped sealing body remains in the deflected position spaced apart from the outlet.

16. The energy-absorbing device of claim 9, wherein:

the dome-shaped sealing body is a mono-stable device that is in an unstable state in a deflected position; and when the gas pressure through the compressible hollow sleeve falls below a second threshold pressure, the dome-shaped sealing body returns to a sealed position against the outlet.

17. A method, comprising:

covering and pressing a dome-shaped sealing body over an outlet of an inner channel of a compressible hollow sleeve that is in fluid communication with an inflatable energy-absorbing body; and responsive to gas pressure through the compressible hollow sleeve being greater than a threshold pressure, deflecting the dome-shaped sealing body with snap-through buckling to expose the outlet through which gas escapes.

18. The method of claim 17, wherein:

the dome-shaped sealing body is a bi-stable device that is in a stable state in a deflected position; and the method further comprises, when the gas pressure through the compressible hollow sleeve falls below a second threshold pressure, maintaining the dome-shaped sealing body in the deflected position spaced apart from the outlet.

19. The method of claim 17, wherein:

the dome-shaped sealing body is a mono-stable device that is in an unstable state in a deflected position; and the method further comprises, when the gas pressure through the compressible hollow sleeve falls below a second threshold pressure, returning the dome-shaped sealing body to a sealed position against the outlet.

20. The method of claim 17, wherein covering and pressing the dome-shaped sealing body over the outlet of the inner channel comprises displacing the compressible hollow sleeve by an amount that is greater than a snap-through displacement of the dome-shaped sealing body.

* * * * *